US012363673B2

(12) United States Patent
Ersoy et al.

(10) Patent No.: US 12,363,673 B2
(45) Date of Patent: Jul. 15, 2025

(54) TECHNIQUE FOR DETERMINING A LOCATION OF A RADIO NETWORK NODE (71) Applicant: Telefonaktiebolaget LM Ericsson (publ), Stockholm (SE)

(72) Inventors: Mehmet Akif Ersoy, Istanbul (TR); Zeki Bilgin, Istanbul (TR); Leyli Karacay, Ümraniye (TR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 381 days.

(21) Appl. No.: 18/007,873

(22) PCT Filed: Jul. 1, 2020

(86) PCT No.: PCT/EP2020/068541
§ 371 (c)(1),
(2) Date: Dec. 2, 2022

(87) PCT Pub. No.: WO2021/244764
PCT Pub. Date: Dec. 9, 2021

(65) Prior Publication Data
US 2023/0232362 A1 Jul. 20, 2023

(30) Foreign Application Priority Data

Jun. 4, 2020 (TR) ................................ 2020/08684

(51) Int. Cl.
H04W 64/00 (2009.01)
(52) U.S. Cl.
CPC .................................. H04W 64/00 (2013.01)
(58) Field of Classification Search
CPC ............................ H04W 64/00; H04W 64/003
(Continued)

(56) References Cited

U.S. PATENT DOCUMENTS 9,838,879 B2    12/2017  Norrman et al.
2013/0033999 A1* 2/2013  Siomina ................ H04W 64/00
                                                            370/252
(Continued)

FOREIGN PATENT DOCUMENTS

EP    3 101 939 A1   12/2016
EP    2773973 B1      5/2017
(Continued)

OTHER PUBLICATIONS

International Search Report and Written Opinion issued in International Application No. PCT/EP2020/068541 dated Feb. 25, 2021 (14 pages).

(Continued)

Primary Examiner — Joseph Arevalo
(74) Attorney, Agent, or Firm — Rothwell, Figg, Ernst & Manbeck, P.C.

(57) ABSTRACT

A technique for determining an estimated location of a radio network node (FBS) in a cellular network is disclosed. A method implementation of the technique comprises (a) determining, for each of a plurality of measurement reports sent by one or more User Equipments, UEs, (UE1) to one or more neighboring radio network nodes of the radio network node (FBS) in the cellular network, an estimated measurement location from which the respective UE (UE1) sent the respective measurement report, wherein each of the plurality of measurement reports includes signal strength information indicating a received signal strength from the radio network node (FBS) as measured by the respective UE (UE1), (b) for each of a plurality of pairs of the estimated measurement locations: dividing a surrounding area covering the estimated measurement locations of the respective pair into two subregions (Region I, Region II; Region III, Region IV), wherein every location in one of the two subregions (Region I, Region II; Region III, Region IV) is closer to one of the (Continued)

estimated measurement locations of the respective pair and every location in the other one of the two subregions (Region I, Region II; Region III, Region IV) is closer to the other one of the estimated measurement locations of the respective pair, and identifying, from the two subregions (Region I, Region II; Region III, Region IV) and based on the signal strength information included in the measurement reports belonging to the estimated measurement locations of the respective pair, the subregion (Region I, Region II; Region III, Region IV) in which the radio network node (FBS) is more likely located, and (c) determining the estimated location of the radio network node (FBS) as an intersected area of the identified subregions (Region I, Region II; Region III, Region IV).

20 Claims, 9 Drawing Sheets

(58) Field of Classification Search
USPC ......... 455/456.1, 522, 456.3, 443, 436, 437, 455/446, 456.5, 434, 452.2
See application file for complete search history.

(56) References Cited

U.S. PATENT DOCUMENTS

| | | | |
|---|---|---|---|
| 2014/0112248 A1* | 4/2014 | Bergman | H04W 28/18 370/328 |
| 2016/0054425 A1* | 2/2016 | Katz | G01S 3/14 342/417 |
| 2017/0078863 A1* | 3/2017 | Kim | H04W 48/16 |
| 2017/0150436 A1* | 5/2017 | Modarres Razavi | H04W 48/20 |
| 2018/0007516 A1* | 1/2018 | Ge | G01S 5/14 |
| 2018/0263004 A1* | 9/2018 | Andersson | H04W 56/001 |
| 2019/0215867 A1* | 7/2019 | Cheng | H04W 8/005 |
| 2019/0349979 A1* | 11/2019 | Park | H04W 72/54 |
| 2020/0097028 A1* | 3/2020 | Axmon | H04L 67/52 |
| 2021/0007104 A1* | 1/2021 | Raghavan | H04W 72/0473 |
| 2021/0051622 A1* | 2/2021 | Manolakos | H04W 48/12 |
| 2021/0120522 A1* | 4/2021 | Kim | H04W 4/02 |
| 2021/0314908 A1* | 10/2021 | Gonzalez Escudero | G01S 1/0423 |
| 2022/0124543 A1* | 4/2022 | Orhan | G06N 3/006 |
| 2022/0167301 A1* | 5/2022 | Goyal | H04L 5/0048 |
| 2022/0416976 A1* | 12/2022 | Baek | H04W 72/51 |
| 2023/0036727 A1* | 2/2023 | Gebremariam | H04W 16/28 |

FOREIGN PATENT DOCUMENTS

| | | | |
|---|---|---|---|
| WO | 03/045096 A1 | 5/2003 | |
| WO | WO-2021244764 A1 * | 12/2021 | ........... G01S 5/0027 |

OTHER PUBLICATIONS

Razavi et al., "Positioning in Cellular Networks: Past, Present, Future", IEEE Wireless Communications and Networking Conference (WCNC): Special Session Workshops, 2018 (6 pages).
Abodunrin, "Detection and Mitigation methodology for Fake Base Stations Detection on 3G / 2G Cellular Networks", Aalto University School of Electrical Engineering, Jul. 27, 2015 (70 pages).
3GPP TS 23.273 V16.3.0 (Mar. 2020), 3rd Generation Partnership Project; Technical Specification Group Services and System Aspects; 5G System (5GS) Location Services (LCS); Stage 2 (Release 16), Mar. 2020 (94 pages).
Scaloni, "Minimization of Drive Test (MDT) an Innovative Methodology for Measuring Customer Performance on Mobile Network", "The GeoSynthesis Project", Geneva, Switzerland, Mar. 11, 2019 (22 pages).

* cited by examiner

TECHNIQUE FOR DETERMINING A LOCATION OF A RADIO NETWORK NODE

CROSS REFERENCE TO RELATED APPLICATIONS

This application is a 35 U.S.C. § 371 National Stage of International Patent Application No. PCT/EP2020/068541, filed 2020 Jul. 1, which claims priority to Turkish patent application no. TR 2020/08684, filed on 2020 Jun. 4. The above identified applications are incorporated by this reference.

TECHNICAL FIELD

The present disclosure generally relates to the field of cellular networks. In particular, a technique for determining an estimated location of a radio network node in a cellular network is presented. The technique may be embodied in methods, computer programs, apparatuses and systems.

BACKGROUND

Localization of network devices and nodes may be vital for many network-based applications. For localization purposes in cellular networks, known positioning methods typically make use of information like the Timing Advance (TA), Round Trip Time (RTT), Reference Signal Received Power (RSRP) or Angle of Arrival (AoA), for example. One common method is trilateration or, more generally, multi-lateration which estimates the distance between a transmitting device and a receiving device based on an appropriate propagation loss model. As a mere example, the following equation may be used according to a Friis propagation loss model with the assumption that an antenna is isotropic with no heat loss:

$$P_r = \frac{P_t G_t G_r \lambda^2}{(4\pi d)^2 L}$$

Here, $P_r$ denotes the reception power, $P_t$ denotes the transmission power, Gt denotes the transmission gain, $G_r$ denotes the reception gain, $\lambda$ denotes the wavelength, d denotes the distance, and L denotes the system loss.

Figure 1:
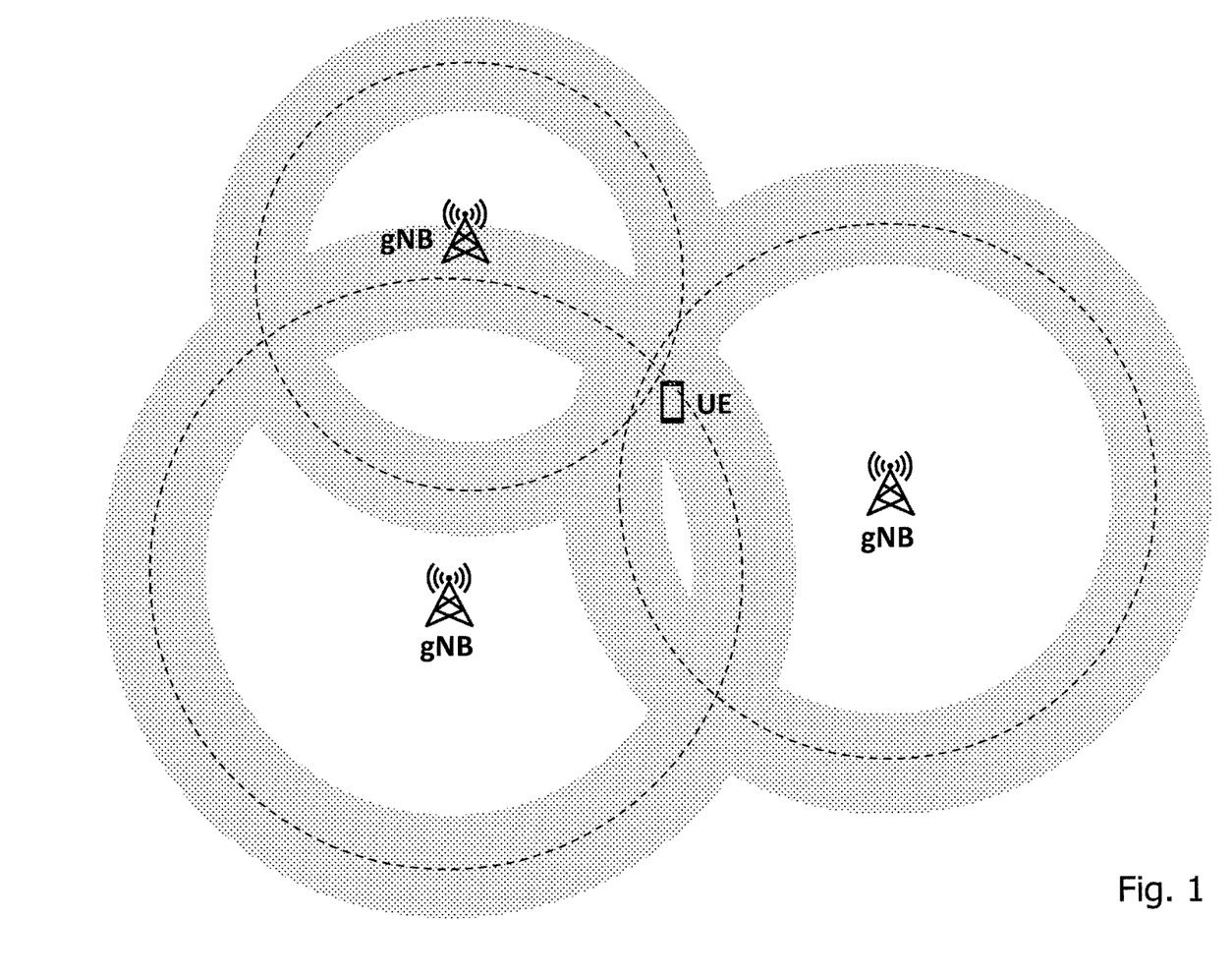
FIG. 1 illustrates a positioning example using trilateration.

From this equation, the distance d between the transmitting device and the receiving device can be calculated when all other parameters are known. However, due to lack of direction or angle information, the distance between a single pair of devices is generally not enough by itself to localize the receiving device. Given that wireless signals travel omnidirectionally, the estimated distance may only be indicative of an area in the form of a ring strip in which the receiving device is likely to be located, wherein the transmitting device is taken as the center of such area. For localization purposes, trilateration and multilateration techniques rely on the measurements (e.g., RSRP values) of several different transmitting nodes (at least three), by which multiple circular strip areas can be obtained, each of which indicates the likely location of the targeted device. The intersection of these circular areas then yields the most probable location of the targeted device. Such situation is exemplarily illustrated in FIG. 1, where the targeted device is a User Equipment UE and the transmitting nodes are radio network nodes ("base stations") of a cellular network, such as next generation NodeBs gNBs of a 5G network, for example. In the following, the User equipment will by abbreviated by UE.

Subscribers to cellular networks have a long-term identifier, called the International Mobile Subscriber Identifier (IMSI), which is embedded in the Universal Subscriber Identity Module (USIM) of a UE. This is a unique identifier assigned to the subscriber and it should therefore be handled with care in the network protocols and applications for security and privacy reasons. A serious threat against subscriber privacy in mobile networks comes from so called False Base Stations (FBSs). These are malicious network devices trying to imitate legitimate radio network nodes with various objectives, such as stealing identity information of subscribers (e.g., IMSI) or tracking them. Another motivation of malicious users to deploy FBSs is to prevent UEs from getting services from legitimate base stations, for example. To achieve this, FBSs usually attract the UEs in the surrounding area by exploiting the UEs' tendency of preferring the cell with the strongest signal in the vicinity and then exploit the normal mode of operation of certain signaling messages that are exchanged between the FBS and the UE. In order to avoid such malicious activities, it is important to detect the existence of FBSs to be able to take preventive measures.

Techniques have been proposed to detect malicious devices. For example, in U.S. Pat. No. 9,838,879 B2, a network-based method for detecting a FBS in a communication network is proposed. The method generally makes use of the fact that, in a cellular network, UEs can be configured to send measurement reports to the base stations they are connected with. Typically, these measurement reports comprise information about the transmitting network nodes in the surrounding area of the reporting UEs. Such information may comprise information like, for example, Physical Cell Identifiers (PCIs), carrier frequencies and/or a received pilot signal strength indications, such as an RSRP or Reference Signal Received Quality (RSRQ). The content and reporting frequency of the measurement reports can be configured by the network node or depending on certain predefined events. According to U.S. Pat. No. 9,838,879 B2, a FBS may be detected by analyzing the UE's typical measurement reports, wherein the cell identifiers (e.g., PCI) in the received measurement reports are compared with the known legitimate cell identifiers of the underlying network to check inconsistencies as a potential sign for the existence of a FBS. For example, if there is a cell identity in at least one measurement report which is not supposed to be reported according to the known neighbor relations in the underlying network topology, then this may be treated as a sign for FBS existence.

Once an FBS is detected using such technique, it may be desirable to estimate the location of this FBS as precisely as possible in order to be able to take precautions and initiate required legal and/or preventive technical procedures. However, the positioning of detected FBSs is an understudied topic. Accurate localization of FBSs turns out to be a non-trivial task. As explained above, using traditional multilateration techniques, it is required to know beforehand the transmitting power ($P_t$) and the receiving power ($P_r$) along with other parameters in order to be able to estimate the distance between a transmitting node and a receiving node. However, in the case of FBS localization, the transmitting power of an FBS is not known and, therefore, the distance cannot be accurately calculated by traditional path loss models. This problem not only appears when localizing a FBS, but also in any other use case when the transmitting power of the radio network node to be localized is unknown.

SUMMARY

Accordingly, there is a need for a technique for determining the location of a radio network node in a cellular network when the transmitting power of the radio network node is not known.

According to a first aspect, a method for determining an estimated location of a radio network node in a cellular network is provided. The method comprises (a) determining, for each of a plurality of measurement reports sent by one or more UEs to one or more neighboring radio network nodes of the radio network node in the cellular network, an estimated measurement location from which the respective UE sent the respective measurement report. Each of the plurality of measurement reports includes signal strength information indicating a received signal strength from the radio network node as measured by the respective UE. The method further comprises (b) for each of a plurality of pairs of the estimated measurement locations: dividing a surrounding area covering the estimated measurement locations of the respective pair into two subregions, wherein every location in one of the two subregions is closer to one of the estimated measurement locations of the respective pair and every location in the other one of the two subregions is closer to the other one of the estimated measurement locations of the respective pair, and identifying, from the two subregions and based on the signal strength information included in the measurement reports corresponding to the estimated measurement locations of the respective pair, the subregion in which the radio network node is more likely located. The method further comprises (c) determining the estimated location of the radio network node as an intersected area of the identified subregions.

Dividing the surrounding area into two subregions may include splitting the surrounding area by a line perpendicular to a line connecting the estimated measurement locations of the respective pair. The one or more neighboring radio network nodes may be part of the cellular network and the radio network node may be an FBS which is not part of the cellular network. The method may further comprise reporting the estimated location of the radio network node to an entity for further processing. At least one of the estimated measurement locations may be determined based on the signal strength information included in the respective measurement report and known locations of the one or more neighboring radio network nodes. At least one of the estimated measurement locations may be determined based on location information determined by the respective UE. The location information may be sent by the respective UE to the one or more neighboring radio network nodes. The location information may be mapped to the respective measurement report using an anonymized identifier.

The estimated measurement locations of the plurality of pairs may be determined from measurement reports sent by a same UE at different locations. The plurality of measurement reports may comprise measurement reports sent by different UEs each sending measurement reports at different locations. The steps (b) and (c) may be separately performed for each of the different UEs to separately determine an estimated location of the radio network node for each of the different UEs based on pairs of estimated measurement locations corresponding to the respective different UE. The estimated location of the radio network node may be determined as an intersected area of the locations of the radio network node estimated for a plurality of the different UEs. When the locations of the radio network node estimated for the plurality of the different UEs comprise intersected areas having different overlapping degrees, the estimated location of the radio network node may be determined as an area comprising the k most overlapped areas of the intersected areas, wherein k is a natural number.

The plurality of pairs of the estimated measurement locations may comprise all possible pairs of the estimated measurement locations regardless of whether the measurement reports corresponding to the estimated measurement locations are sent by a same or different UE. The plurality of measurement reports may comprise measurement reports sent by different UEs, wherein identifying a subregion in which the radio network node is more likely located comprises compensating differences in reception sensitivities of the different UEs. The plurality of measurement reports may correspond to a subset of all measurement reports sent by the one or more UEs to the one or more neighboring radio network nodes. Steps (b) and (c) may be performed on a subset of the estimated measurement locations, wherein the subset may be selected to have a uniform geographical distribution over an area covered by the estimated measurement locations.

According to a second aspect, a computer program product is provided. The computer program product comprises program code portions for performing the method of the first aspect when the computer program product is being executed on a network node, for example, a network node as described in the following. The computer program product may be stored on a computer readable recording medium, such as a semiconductor memory, DVD, CD-ROM, and so on.

According to a third aspect, a network node for determining an estimated location of a radio network node in a cellular network is provided. The network node comprises processing means configured to (a) determine, for each of a plurality of measurement reports sent by one or more UEs to one or more neighboring radio network nodes of the radio network node in the cellular network, an estimated measurement location from which the respective UE sent the respective measurement report. Each of the plurality of measurement reports includes signal strength information indicating a received signal strength from the radio network node as measured by the respective UE. The network node further comprises processing means configured to (b) for each of a plurality of pairs of the estimated measurement locations: divide a surrounding area covering the estimated measurement locations of the respective pair into two subregions, wherein every location in one of the two subregions is closer to one of the estimated measurement locations of the respective pair and every location in the other one of the two subregions is closer to the other one of the estimated measurement locations of the respective pair, and identify, from the two subregions and based on the signal strength information included in the measurement reports corresponding to the estimated measurement locations of the respective pair, the subregion in which the radio network node is more likely located. The network node further comprises processing means configured to (c) determine the estimated location of the radio network node as an intersected area of the identified subregions.

The network node may be configured to perform any of the method steps presented herein with respect to the first aspect. The processing means may comprise at least one processor and at least one memory, wherein the at least one memory contains instructions executable by the at least one processor such that the processing means are operable to perform the method steps presented herein.

According to a fourth aspect, there is provided a system comprising a network node according to the third aspect and the one or more UEs.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more application specific integrated circuits (ASICs) and/or using one or more digital signal processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2:
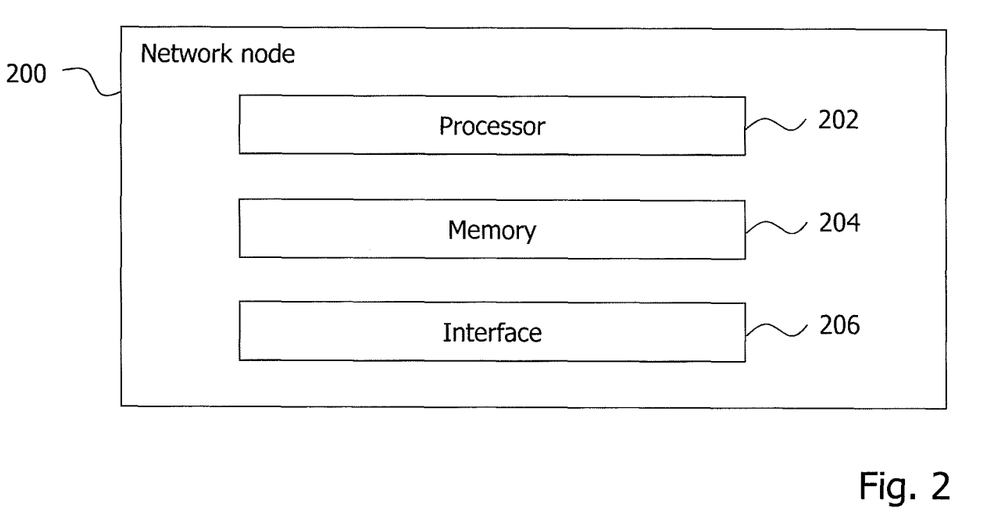
FIG. 2 illustrates an exemplary embodiment of a network node according to the present disclosure.

FIG. 2 schematically illustrates an exemplary embodiment of a network node 200 which is configured to determine an estimated location of a radio network node in a cellular network. The network node 200 comprises processing means enabling the network node 200 to perform the method steps described herein below. In the shown example, the processing means comprise at least one processor 202 and at least one memory 204, wherein the at least one memory 204 contains instructions executable by the at least one processor 202 such that the processing means are operable to carry out the method steps described herein. Optionally, the network node 200 may include an interface 206 configured for communication, e.g., for reporting the determined estimated location of the radio network node in the cellular network to an entity for further processing.

It will be understood that the network node 200 may be implemented on a physical computing unit or a virtualized computing unit, such as a virtual machine, for example. It will further be appreciated that the network node 200 may not necessarily be implemented on a standalone computing unit, but may be implemented as components—realized in software and/or hardware—residing on multiple distributed computing units as well, such as in a cloud computing environment, for example. The network node 200 may be a node of a Core Network (CN) or a Radio Access Network (RAN) of the cellular network, for example.

Figure 3:
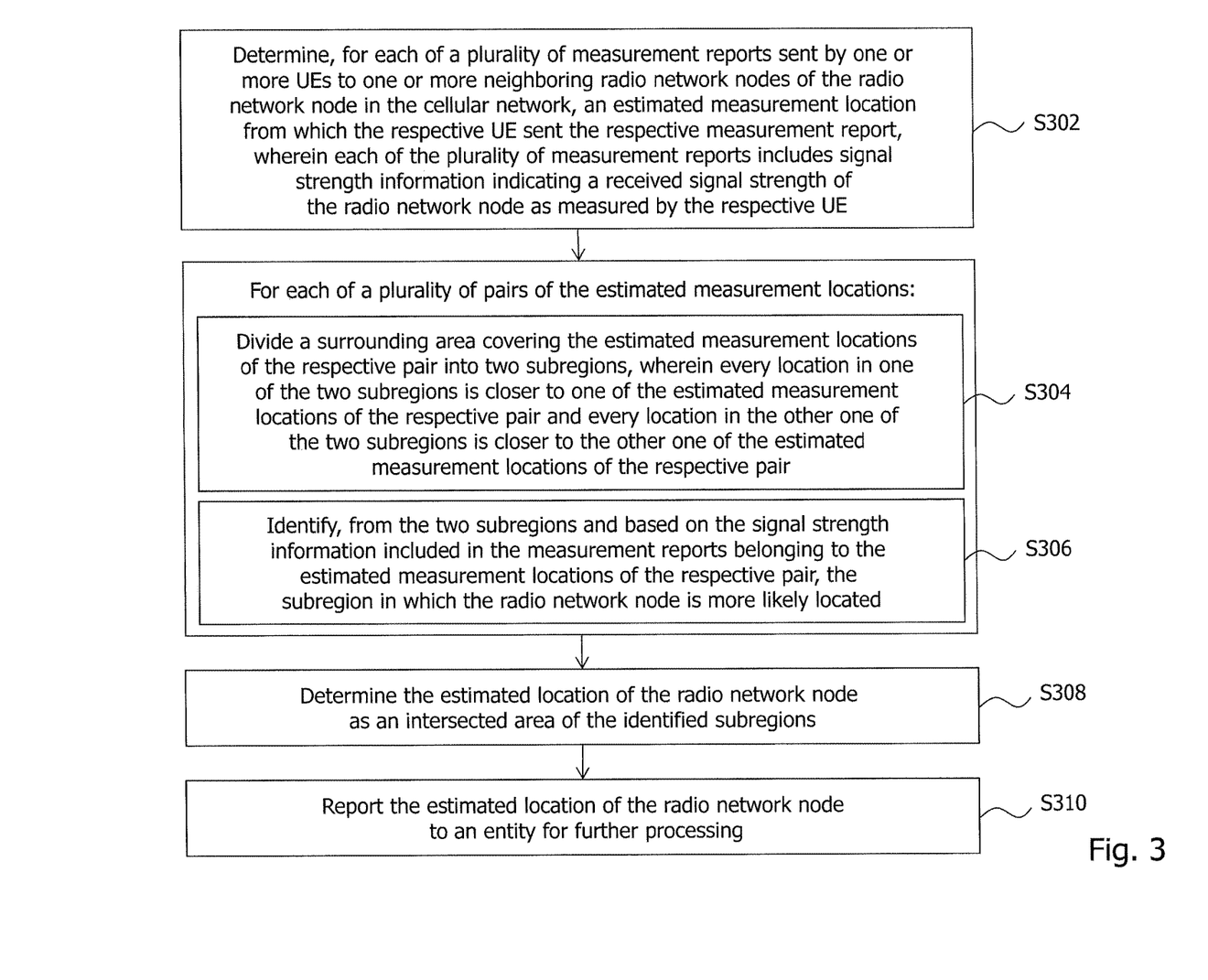
FIG. 3 illustrates an exemplary method embodiment for determining an estimated location of a radio network node according to the present disclosure.

FIG. 3 illustrates a method which may be performed by the network node 200 according to the present disclosure. The method is dedicated to determining an estimated location of a radio network node in a cellular network. In step S302, the network node 200 may (a) determine, for each of a plurality of measurement reports sent by one or more UEs to one or more neighboring radio network nodes of the radio network node in the cellular network, an estimated measurement location from which the respective UE sent the respective measurement report. Each of the plurality of measurement reports includes signal strength information indicating a received signal strength from the radio network node as measured by the respective UE. For each of a plurality of pairs of the estimated measurement locations, the network node 200 may then (b): divide, in step S304, a surrounding area covering the estimated measurement locations of the respective pair into two subregions, wherein every location in one of the two subregions is closer to one of the estimated measurement locations of the respective pair and every location in the other one of the two subregions is closer to the other one of the estimated measurement locations of the respective pair, and identify, in step S306, from the two subregions and based on the signal strength information included in the measurement reports corresponding to the estimated measurement locations of the respective pair, the subregion in which the radio network node is more likely located. In step S308, the network node 200 may (c) determine the estimated location of the radio network node as an intersected area of the identified subregions.

According to this method, it may be possible to estimate the position of a transmitting radio network node in a cellular network without requiring to know the transmitting power of the node. The radio network node may be a network node not accessible by the cellular network (e.g., not accessible by another entity of the cellular network or an operator of the cellular network) and, as such, not only the position and the transmitting power of the radio network node but also measurement reports sent from the one or more UEs to the radio network node may be inaccessible by the cellular network (e.g., inaccessible/unknown to the other entity or operator of a cellular network). Hence, the network node might not be part of the cellular network. Since such information might not be available for the radio network node to be localized, traditional multilateration techniques to determine the location of the radio network node might not be applicable and the radio network node may instead be localized using information collected from the one or more neighboring radio network nodes. Contrary to the radio network node, the one or more neighboring network nodes may be accessible by the cellular network (e.g., accessible by another entity of the cellular network or an operator of the cellular network) and, as such, not only the positions and the transmitting powers of these neighboring nodes but also the measurement reports sent from the one or more UEs to these neighboring nodes may generally be accessible by the cellular network (e.g., accessible/known to the other entity or operator of the cellular network). Based on the information collected from the one or more neighboring nodes, the location of the radio network node may then be estimated in accordance with the procedure described herein.

Each of the one or more UEs may be configured to send measurement reports to the radio network node it is connected with. Each measurement report might not only contain information about this radio network node, but also information about other transmitting network nodes detected by the UE in the vicinity of the UE, i.e., neighboring radio network nodes adjacent to the radio network node the UE is connected with. The information in a measurement report about either one of such network nodes may include an identifier of the respective network node (e.g., a PCI) as well as an indication of a received signal strength from the respective network node (e.g., an RSRP, an RSRQ, or more generally a pilot signal strength) and, optionally, further information, such as a carrier frequency, or the like. The content and the reporting frequency (e.g., reporting interval or condition-based reporting) of the measurement reports may be configured by the radio network node the UE is connected with.

Although the radio network node to be localized might not be accessible by the cellular network, as described above, the radio network node may nevertheless be known by the cellular network (e.g., known to the other entity or operator of the cellular network). More specifically, the radio network node may be known from the measurement reports sent from the one or more UEs to the one or more neighboring radio network nodes in the cellular network, from which the existence of the radio network node may be detected. The existence of such radio network node may be detected in accordance with conventional techniques, such as the above-described approach known from U.S. Pat. No. 9,838,879 B2, for example. The technique presented herein may be said to step in after the detection of the existence of the radio network node, and the measurement reports taken into consideration for the purpose of the presented technique may include only those measurement reports which contain information about the radio network node. Both the radio network node to be localized and the one or more neighboring radio network nodes may correspond to eNodeBs (eNBs) in case of a 4G network or gNBs the case of a 5G network, for example, and may also be denoted as "base stations".

In order to estimate the location of the radio network node, the method according to steps (a) to (c) may be carried out. In accordance with step (a), which corresponds to step S302 in FIG. 3, the locations of the one or more UEs at the time of sending the measurement reports to the one or more neighboring radio network nodes may be determined. Thus, an estimated measurement location from which the respective UE sent the measurement report may be determined for each of the plurality of measurement reports which are sent by the one or more UEs to the one or more neighboring radio network nodes. As described above, the plurality of measurement reports may include (e.g., only) measurement reports which contain signal strength information regarding the radio network node. In other words, each of the plurality of measurement reports may include signal strength information indicating a received signal strength from the radio network node as measured (or "received") by the respective UE, wherein the received signal strength may correspond to the signal strength measured from a signal transmitted from the radio network node to the UE. As said, the signal strength may be indicated using an RSRP or RSRQ value, for example.

In accordance with step (b), pairwise comparisons among the determined estimated measurement locations may then be performed in order to identify subregions in which the radio network node is likely located. For each of a plurality of pairs of the estimated measurement locations, a surrounding area covering the estimated measurement locations determined for the respective pair may be divided into two subregions (corresponding to step S304 in FIG. 3). To this end, the determined estimated measurement locations may comprise at least three estimated measurement locations, and the plurality of measurement reports for which the estimated measurement locations were determined may comprise at least three measurement reports accordingly. When dividing the surrounding area into two subregions, the two subregions may be determined in a way that every location in one of the two subregions is closer to one of the estimated measurement locations of the respective pair and every location in the other one of the two subregions is closer to the other one of the estimated measurement locations of the respective pair. This may be achieved by splitting the surrounding area by a line perpendicular to a line connecting the estimated measurement locations of the respective pair. The perpendicular line may cross the connecting line at the middle of the connecting line, for example. The connecting line may correspond to a line of sight between the two measurement locations.

The surrounding area may correspond to an area encompassing both the estimated measurement locations of the respective pair or, in other words, the surrounding area may correspond to an overall area within which it is tried to detect the radio network node. The precise outer boundary of this surrounding area might not be of particular relevance since, as will become apparent below, the location of the radio network node may be estimated by intersecting a plurality of subregions, which narrows down the surrounding area to a subportion which is confined by the boundaries of the subregions. As a mere example, the surrounding area may be defined by a union or intersection of estimated regions in which the radio network node is likely located.

From the two subregions into which the surrounding area has been divided, the subregion in which the radio network node is more likely located may then be identified (corresponding to step S304 in FIG. 3). The subregion in which the radio network node is more likely located may be determined based on the signal strength information included in the measurement reports corresponding to the estimated measurement locations of the respective pair (i.e., included in the measurement reports for which the estimated measurement locations of the respective pair were determined) or, more specifically, based on the received signal strength from the radio network node indicated therein. More specifically, the subregion in which the radio network node is more likely located may be selected from among the two subregions as the subregion of which every location is closer to the one of the estimated measurement locations whose underlying measurement report (i.e., the measurement report for which the one of the estimated measurement locations was determined) includes signal strength information which indicates a higher received signal strength from the radio network node than the received signal strength indicated by the signal strength information included in the measurement report underlying the other one of the estimated measurement locations of the respective pair.

Finally, in accordance with step (c), which corresponds to step S306 of FIG. 3, once such subregions in which the radio node is more likely located have been determined for each of the plurality of pairs of the estimated measurement locations, the estimated location of the radio network node to be localized may then be determined as an intersected area of the identified subregions. In other words, for each of the plurality of pairs of the estimated measurement locations, a more likely subregion is identified first in accordance with step (b) and, in step (c), an intersection of the resulting plurality of the identified subregions may then be taken as the estimated location of the radio network node.

Although it will be understood that the procedure according to steps (a) to (c) may be used to identify any kind of radio network node for which the transmitting power is not known, as described above, in one particular variant, the radio network node may be an FBS. The one or more neighboring radio network nodes may thus be part of (or "belong to") the cellular network and the radio network node may be an FBS which is not part of (or which does "not belong to") the cellular network. Once the estimated location of the radio network node has been determined, this information may be passed on to another entity which may process the information and take action accordingly. For example, the information may be reported to a network operator or legal authority which may use the information about the location of the FBS in order to take required legal or preventive technical actions. The method may thus further comprise reporting the estimated location of the radio network node to an entity for further processing. This step is indicated as step S310 in FIG. 3.

Figure 4:
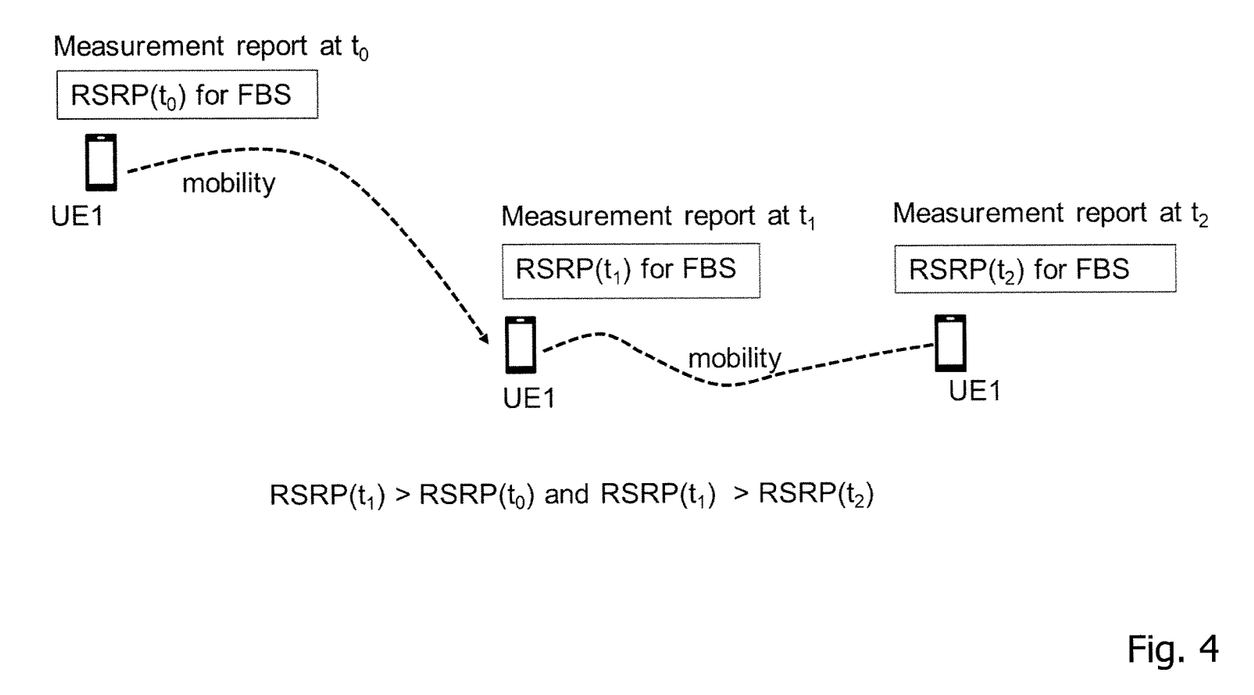
FIG. 4 illustrates an exemplary method embodiment involving a comparison of measurement reports belonging to a same UE.
Figure 5:
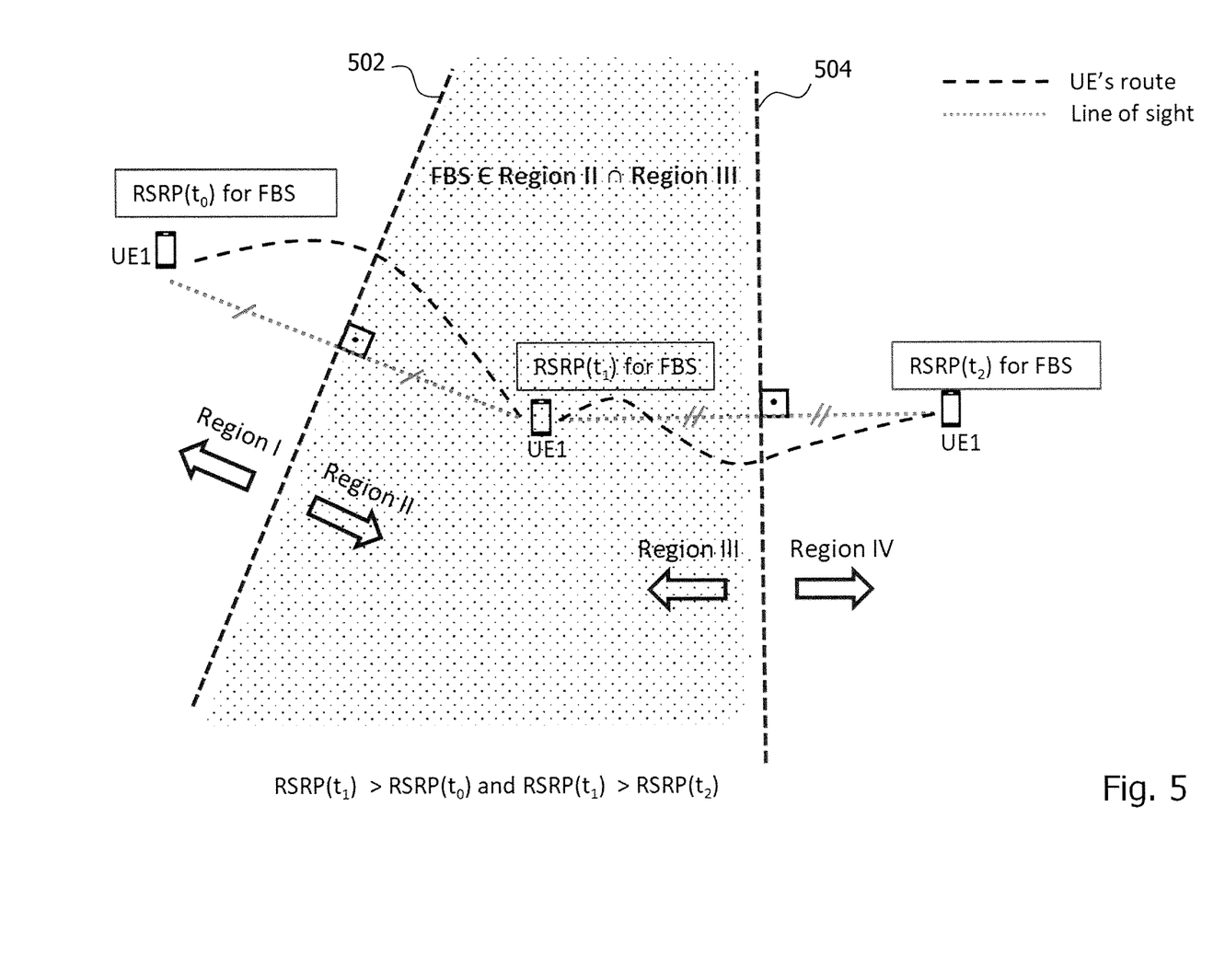
FIG. 5 illustrates splitting a surrounding area into subregions and intersecting the subregions to determine the estimated location of the radio network node in the embodiment of FIG. 4.

The above procedure according to steps (a) to (c) will now be exemplified with respect to an embodiment shown in FIGS. 4 and 5 which elucidates the procedure in illustrative form. The exemplary embodiment relates to a case in which a comparison of measurement reports belonging to the same UE takes place in order to localize a radio network node, such as an FBS. As described above, UEs may send measurement reports at certain intervals or based on certain conditions and these measurement reports may contain signal strength information (e.g., RSRP) about other network nodes in the surrounding area of the respective UE. Therefore, UEs around an FBS may be expected to send measurement reports containing signal strength information about the FBS. This situation is exemplarily illustrated in FIG. 4, where UE1 performs measurements at certain intervals as it moves and sends corresponding measurement reports at different times $t_0$, $t_1$ and $t_2$ to respective neighboring radio network nodes (not shown). These measurement reports contain RSRP values for the FBS (not shown), wherein $RSRP(t_0)$, $RSRP(t_1)$ and $RSRP(t_2)$ denote the RSRP values for the FBS at times $t_0$, $t_1$ and $t_2$, respectively.

In this example, it is assumed that $RSRP(t_1)>RSRP(t_0)$ and $RSRP(t_1)>RSRP(t_2)$. $RSRP(t_1)>RSRP(t_0)$ implies that UE1's location at time $t_1$ is expected to be closer to the FBS than UE1's location at time $t_0$. Therefore, considering a region in which every location is closer to UE1's location at time $t_1$ than to UE1's location at time $t_0$, it may be assumed that the FBS is more likely located in this region. As illustrated in FIG. 5, such region can be identified by applying a geometrical split of the surrounding area by drawing a straight line connecting two subsequent measurement locations of UE1. At the middle of such connecting line, another line perpendicular to the connecting line may be drawn. In FIG. 5, such perpendicular line is denoted by reference numeral 502, for example, which splits the surrounding area covering the measurement locations at times $t_0$ and $t_1$ into two subregions denoted as Region I and Region II. Due to $RSRP(t_1)>RSRP(t_0)$, it can be assumed that every location in Region II is closer to UE1's location at time $t_1$ than to UE1's location at time $t_0$ and it may therefore be assumed that the FBS is more likely in Region II than in Region I. Similarly, $RSRP(t_1)>RSRP(t_2)$ implies that UE1's location at time $t_1$ is expected to be closer to the FBS than UE1's location at time $t_2$. Thus, another geometrical split dividing the surrounding area by another perpendicular line 504 at the middle of the line connecting the measurement locations at times $t_1$ and $t_2$ yields further subregions denoted as Region III and Region IV. Due to $RSRP(t_1)>RSRP(t_2)$, it can be assumed that every location in Region III is closer to UE1's location at time $t_1$ than to UE1's location at time $t_2$ and it may therefore be assumed that the FBS is more likely in Region III than in Region IV. Finally, an intersection of the more likely subregions Region II and Region III gives the potential area in which the FBS is most likely located, as indicated by the dotted area in FIG. 5. The estimated location of the FBS in this example thus corresponds to the intersected area defined by Region II∩Region III.

As described above, in accordance with step (a) of the method, the estimated measurement locations at which the one or more UEs sent the respective measurement reports to the one or more neighboring radio network nodes may be determined before the further determination in accordance with steps (b) and (c) takes place. In order to determine the estimated measurement locations for the respective measurement reports in accordance with step (a), different approaches may be employed.

In a first variant, at least one (or all) of the estimated measurement locations may be determined based on the signal strength information included in the respective measurement report and known locations of the one or more neighboring radio network nodes. As described above, the measurement reports may contain measurements regarding the radio network node the UE is connected with and regarding neighboring radio network nodes, i.e., in other words, the measurement reports may contain measurements of the primary (connected) cell and nearby cells of the cellular network. Also, the positions of the neighboring radio network nodes may generally be known, as described above, as these network nodes correspond to legitimate nodes of the cellular network. A UE location at the time of sending a measurement report may therefore be calculated based on the received signal strengths contained in the measurement reports and the known locations of the neighboring radio network nodes. These calculations may be carried out using conventional techniques, such as trilateration or multilateration, for example.

In a second variant, at least one (or all) of the estimated measurement locations may be determined based on location information determined by the respective UE, wherein the location information may be sent by the respective UE to the one or more neighboring radio network nodes. For example, a UE may obtain its location at the time of sending the measurement report on its own, e.g., using the Global Positioning System (GPS) or using trilateration/multilateration methods. The UE may send the determined location to the neighboring radio network nodes, e.g., along with the measurement reports. At the radio network nodes, or at other entities of the cellular network, the received UE locations and measurement reports may be matched based on UE identifiers sent with the UE locations and the measurement reports to thereby determine which UE location corresponds to which measurement report. In other words, the location information sent by the respective UE may be mapped to the respective measurement report using an identifier of the UE.

In one particular implementation of this variant, anonymized identifiers may be assigned to the measurement reports and to the UE locations so that, when this information is sent to a radio network node, the measurement reports can be matched with the UE locations. The location information may thus be mapped to the respective measurement report using an anonymized identifier, e.g., an anonymized identifier of the UE. In this way, it may be determined which measurement reports are sent by which UE, and it may thus be differentiated whether the respective measurement reports have been sent by the same UE or by different UEs, without identifying the UE itself due to the anonymization of the identifier. Privacy issues may therefore be avoided. The anonymized identifiers may be assigned by the neighboring radio network nodes or other entities of the cellular network, for example. The anonymized identifiers may correspond to uniquely generated identifiers which might not resemble identifiers currently defined in a standard, such as 3GPP identifiers like an IMSI or a Globally Unique Temporary ID (GUTI), for example.

It will be understood that, while, in the second variant, an identifier may be necessary to map the location information sent by the UEs to the measurement reports, in the first variant, there may be no need to identify which measurement report is sent by which UE because the location from which the measurement report is sent may be calculated without any mapping between the UEs and measurement reports. The first variant may thus be applied in cases where the measurement reports do not include any identifiers related to the UEs, for example. If anonymized identifiers are used, as in the second variant, it may be possible to differentiate which measurement reports belong to the same UE and which reports belong to different UEs, as said. If no identifiers are available, on the other hand (as in the first variant), all measurement reports may be treated as if they belonged to the same UE, for example.

Depending on whether the measurement reports belong to same UE or to different UEs, different approaches for estimating the location of the radio network node may be employed. In one such variant, which is in line with the above-described embodiment of FIGS. 4 and 5, the estimated measurement locations of the plurality of pairs of the estimated measurement locations processed in step (b) may be determined from measurement reports sent by a same UE at different locations. The different locations may correspond to (e.g., subsequent) measurement locations of the UE at which the UE performs measurements as the UE moves, as in the embodiment of FIGS. 4 and 5, for example. The plurality of measurement reports sent by the one or more UEs may in other words comprise measurement reports (e.g., subsequently) sent by a same UE at different locations.

In another variant, the plurality of measurement reports sent by the one or more UEs may comprise measurement reports sent by different UEs, wherein each of the different UEs may send measurement reports at different locations (e.g., subsequent measurement locations as these UEs move). In this variant, the accuracy of the estimation of the location of the radio network node may be improved when steps (b) and (c) are performed independently for each UE and the resulting estimated locations (corresponding to intersected areas of subregions, as described above) are then intersected with each other. In this variant, the plurality of measurement reports may thus comprise measurement reports sent by different UEs each sending measurement reports at different locations, wherein steps (b) and (c) may be separately performed for each of the different UEs to separately determine an estimated location of the radio network node for each of the different UEs based on pairs of estimated measurement locations belonging to the respective different UE. The estimated location of the radio network node may then be determined as an intersected area of the locations of the radio network node estimated for a plurality (or all) of the different UEs.

Figure 6:
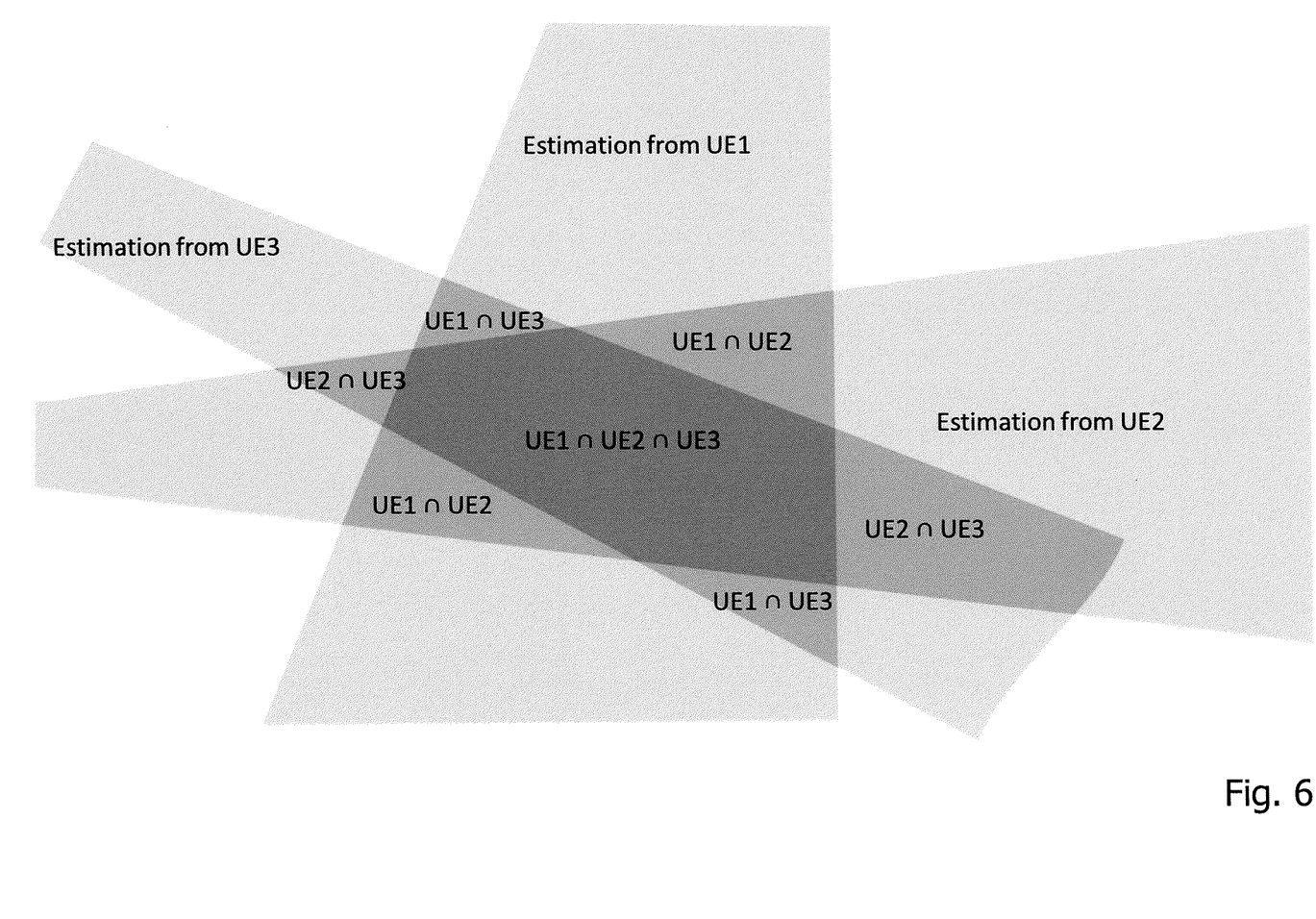
FIG. 6 illustrates an exemplary embodiment in which several estimated locations are determined independently per UE in accordance with the embodiment of FIGS. 4 and 5, wherein the estimated location of the radio network node is determined as the most overlapped intersected area.

Such situation is exemplarily illustrated in FIG. 6, from which it may be seen that an intersection of areas which are identified from measurement reports belonging to different UEs yields an even more accurate estimation of the location of the radio network node. Following a probabilistic approach, it may be assumed that, the higher the degree of intersection of different estimated intersected areas is, the higher the likelihood that the radio network node is located within this area gets. In the example of FIG. 6, it may be assumed that it is more likely that the radio network node is located in the area labeled as UE1 ∩ UE2 ∩ UE3 as compared to other areas labeled as UE1 ∩ UE2, UE1 ∩ UE3 and UE2 ∩ UE3. In other words, it may be said that more overlap leads to a higher likelihood that the radio network node is within the respective area. When the locations of the radio network node estimated for the plurality of the different UEs thus comprises intersected areas having different overlapping degrees, the estimated location of the radio network node may be determined as an area comprising the k most overlapped areas of the intersected areas, wherein k is a natural number. An overlapping degree of an intersected area may correspond to the number of locations of the radio network node estimated for the plurality of the different UEs which overlap in the intersected area. It will be understood that the estimated location of the radio network node may be an approximate area, rather than an exact location. If the estimation of an exact location of the radio network node is desired, such location may be determined as the geometric center of the k most overlapped areas, for example.

Figure 7:
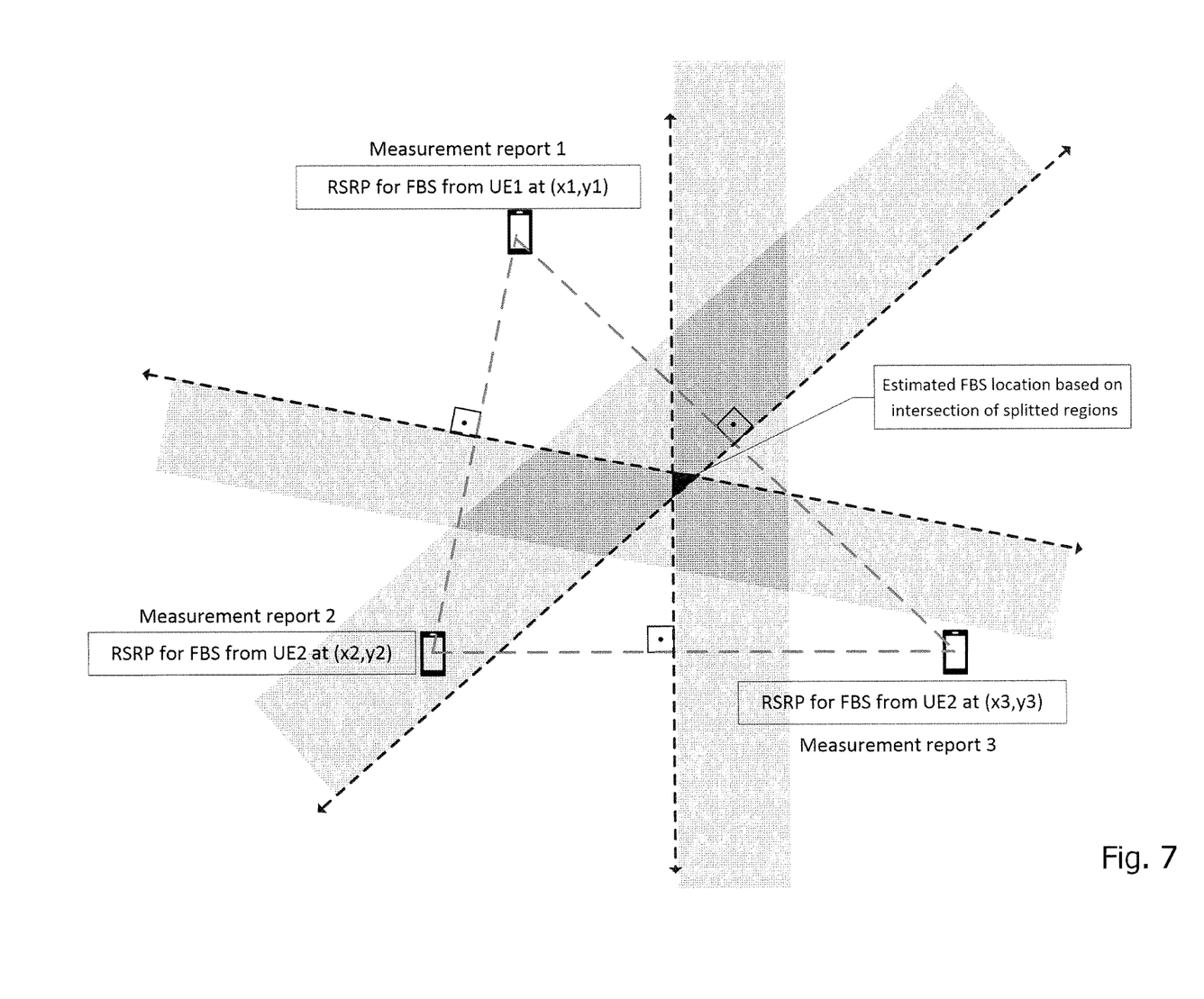
FIG. 7 illustrates an exemplary embodiment involving a comparison of all possible pairwise combinations of measurement reports belonging to different UEs.

While the above exemplary embodiments relate to cases in which the pairwise comparisons of the measurement reports in accordance with step (b) are performed in consideration of whether the measurement reports belong to the same UE or to different UEs, an improvement may be achieved by conducting pairwise comparisons among all measurement reports available, i.e., regardless of whether they belong to the same UE or not. In other words, all possible pairwise comparisons between all available measurement reports may be conducted without taking UE identity into consideration. The plurality of pairs of the estimated measurement locations may as such comprise all possible pairs of the estimated measurement locations regardless of whether the measurement reports corresponding to the estimated measurement locations are sent by a same or different UE. In this way, a greater number of pairwise comparisons may be performed and a more precise estimated location of the radio network node may be achieved. FIG. 7 exemplarily illustrates an embodiment in which three measurement reports belonging to two different UEs are available. In this case, three pairwise comparisons between measurement reports 1 and 2, measurement reports 1 and 3 and measurement reports 2 and 3 are performed without considering the UE identity.

Although it will be understood that, if all possible measurement report combinations are considered in this way higher precision in the estimation may generally be the result, there may be cases in which such consideration of all possible combinations might not be needed or expedient. For example, if there are plenty of UEs connected to the network and, also, if there are plenty of available measurement reports for each UE, enough data may already be available from a single UE, so that estimations with sufficient precision can be achieved from the measurement reports of this UE, without the need of mixing data from different UEs. In another case, UEs may have different reception sensitivities resulting in different measurement (e.g., RSRP) values for the same location. In these cases, it may also be expedient to consider the data per UE only. On the other hand, the differences in reception sensitivities may also be taken into consideration and corresponding compensation calculations could be performed when performing the pairwise comparisons. Thus, when the plurality of measurement reports comprises measurement reports sent by different UEs, identifying a subregion in which the radio network node is more likely located (in accordance with step (b)) may comprise compensating differences in reception sensitivities of the different UEs, for example.

In another aspect, considering all possible combinations might not be expedient if the total number of measurement reports is extremely high and would demand excessive computational resources. In this case, in order to decrease the total number of required comparisons, a subset of measurement reports may be selected, based on which the above steps (a) to (c) may then be performed. The plurality of measurement reports may thus correspond to a subset of all measurement reports sent by the one or more UEs to the one or more neighboring radio network nodes.

Subsets may also be formed with respect to the estimated measurement locations, for example. While it will be understood that subset selection may be random, a more reasonable subset selection may involve considering only those measurement reports which have been sent from locations that form a uniform geographical distribution. Steps (b) and (c) may thus be performed on a subset of the estimated measurement locations, wherein the subset may be selected to have a uniform geographical distribution over an area covered by the estimated measurement locations, for example.

As has become apparent from the above, the present disclosure provides a network-based technique for determining an estimated location of a radio network node in a cellular network. The presented technique may enable locating a radio network node in a cellular network without requiring to know the transmitting power of the targeted node. The technique may be employed to localize malicious nodes, such as FBSs, for example, and may generally involve the splitting of relevant regions into subregions such that the targeted node is more likely in one of the subregions, wherein intersections of a plurality of such subregions yield an approximate location of the targeted node. The presented technique may be scalable in the sense that it can localize targeted nodes anywhere in the cellular network and, as it may benefit from regular UE measurement reports which are available in the network anyway, there may be no need for installation or reconfiguration of devices in the network, leaving the operation of the network devices unchanged.

Figure 8:
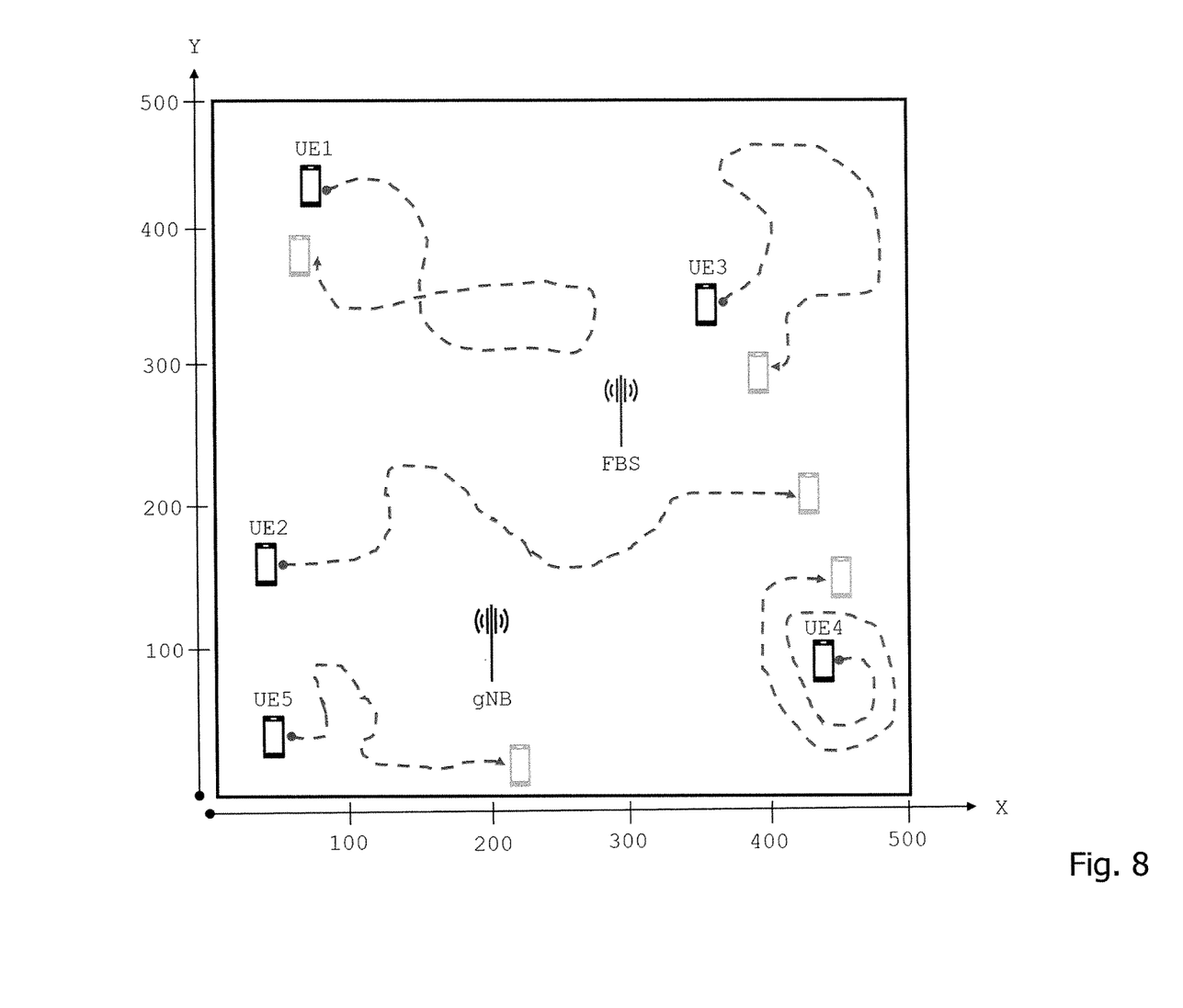
FIG. 8 illustrates an experimental setup used to prove the effectiveness of the presented technique.
Figure 9:
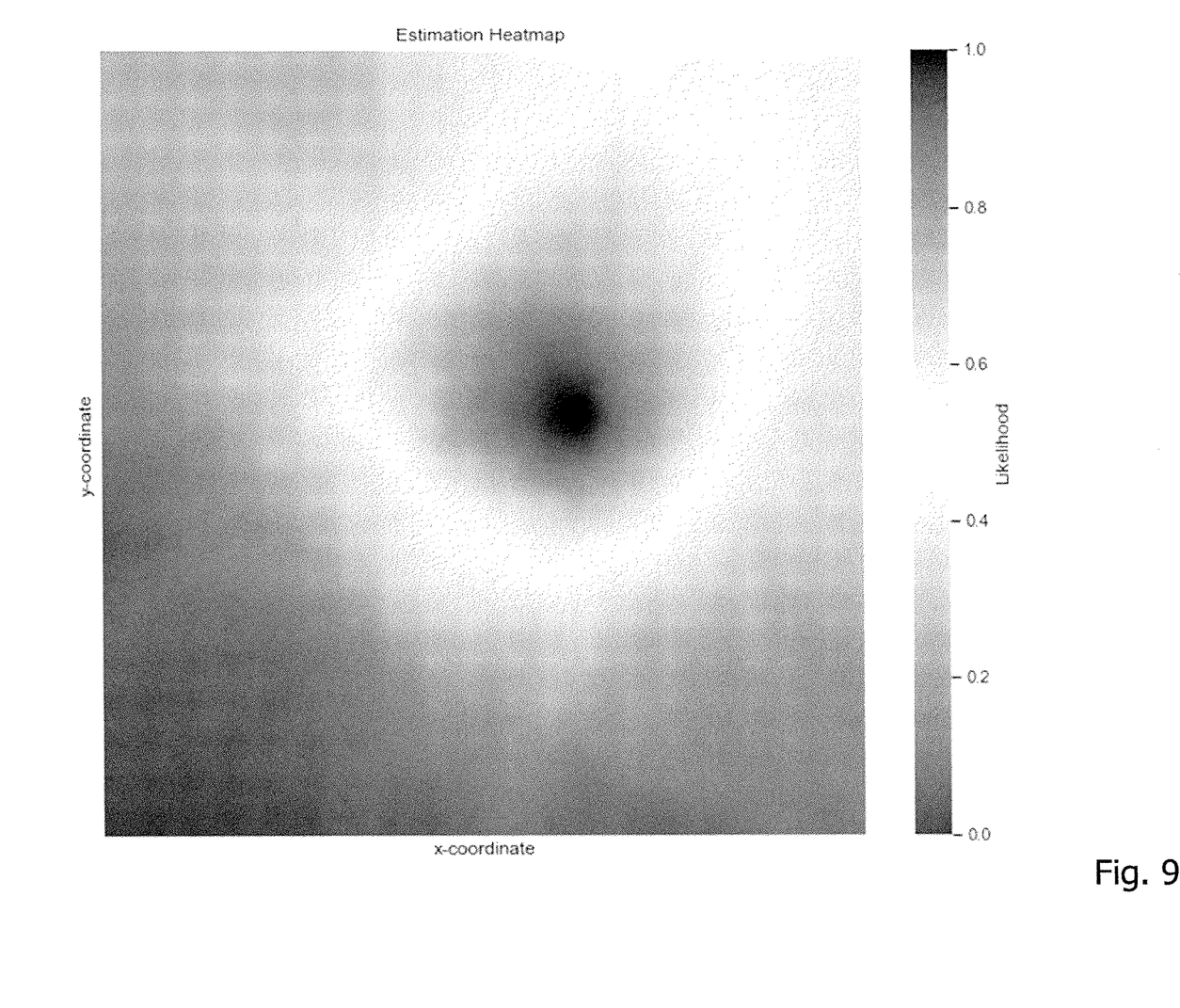
FIG. 9 illustrates a heatmap showing the results of a potential experimental setup.

The effectiveness of the presented technique has been proved in experimental setups, in which a series of measurement values related to an FBS was taken. A conceptual visualization of such setup is depicted in FIG. 8, which shows that a legitimate gNB as well as an FBS were placed in the experimental area. In the experiment, different numbers of UEs were used for different experiments, wherein the figure exemplarily shows a scenario of five UEs performing random walks in the area. A heatmap illustrating the results of a potential experimental setup (not necessarily corresponding to the one shown in FIG. 8) is depicted in FIG. 9, from which the determined center with the highest likelihood regarding the estimated location of the FBS may be seen.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for determining an estimated location of a radio network node in a cellular network, the method comprising:
   (a) determining, for each of a plurality of measurement reports sent by one or more user equipments (UEs) to one or more neighboring radio network nodes of the radio network node in the cellular network, an estimated measurement location from which the respective UE sent the respective measurement report, wherein each of the plurality of measurement reports includes signal strength information indicating a received signal strength from the radio network node as measured by the respective UE;
   (b) for each of a plurality of pairs of the estimated measurement locations:
      (b1) dividing a surrounding area covering the estimated measurement locations of the respective pair into two subregions, wherein every location in one of the two subregions is closer to one of the estimated measurement locations of the respective pair and every location in the other one of the two subregions is closer to the other one of the estimated measurement locations of the respective pair, and
      (b2) identifying, from the two subregions and based on the signal strength information included in the measurement reports corresponding to the estimated measurement locations of the respective pair, the subregion in which the radio network node is more likely located; and
   (c) determining the estimated location of the radio network node as an intersected area of the identified subregions, wherein
   the estimated measurement locations of the plurality of pairs are determined from measurement reports sent by a same UE at different locations,
   the plurality of measurement reports comprise measurement reports sent by different UEs each sending measurement reports at different locations,
   steps (b) and (c) are separately performed for each of the different UEs to separately determine an estimated location of the radio network node for each of the different UEs based on pairs of estimated measurement locations corresponding to the respective different UE, and
   the estimated location of the radio network node is determined as an intersected area of the locations of the radio network node estimated for a plurality of the different UEs.

2. The method of claim 1, further comprising:
reporting the estimated location of the radio network node to an entity for further processing.

3. The method of claim 1, wherein at least one of the estimated measurement locations is determined based on the signal strength information included in the respective measurement report and known locations of the one or more neighboring radio network nodes.

4. The method of claim 1, wherein at least one of the estimated measurement locations is determined based on location information determined by the respective UE, wherein the location information is sent by the respective UE to the one or more neighboring radio network nodes.

5. The method of claim 4, wherein the location information is mapped to the respective measurement report using an anonymized identifier.

6. The method of claim 1, wherein, when the locations of the radio network node estimated for the plurality of the different UEs comprise intersected areas having different overlapping degrees, the estimated location of the radio network node is determined as an area comprising the k most overlapped areas of the intersected areas, wherein k is a natural number.

7. The method of claim 1, wherein the plurality of measurement reports comprise measurement reports sent by different UEs and wherein identifying a subregion in which the radio network node is more likely located comprises compensating differences in reception sensitivities of the different UEs.

8. The method of claim 1, wherein the plurality of measurement reports corresponds to a subset of all measurement reports sent by the one or more UEs to the one or more neighboring radio network nodes.

9. The method of claim 1, wherein steps (b) and (c) are performed on a subset of the estimated measurement locations, wherein the subset is selected to have a uniform geographical distribution over an area covered by the estimated measurement locations.

10. A network node for determining an estimated location of a radio network node in a cellular network, the network node comprising processing circuitry configured to:
(a) determine, for each of a plurality of measurement reports sent by one or more user equipments (UEs) to one or more neighboring radio network nodes of the radio network node in the cellular network, an estimated measurement location from which the respective UE sent the respective measurement report, wherein each of the plurality of measurement reports includes signal strength information indicating a received signal strength from the radio network node as measured by the respective UE;
(b) for each of a plurality of pairs of the estimated measurement locations:
(b1) divide a surrounding area covering the estimated measurement locations of the respective pair into two subregions, wherein every location in one of the two subregions is closer to one of the estimated measurement locations of the respective pair and every location in the other one of the two subregions is closer to the other one of the estimated measurement locations of the respective pair, and
(b2) identify, from the two subregions and based on the signal strength information included in the measurement reports corresponding to the estimated measurement locations of the respective pair, the subregion in which the radio network node is more likely located; and
(c) determine the estimated location of the radio network node as an intersected area of the identified subregions, wherein
the estimated measurement locations of the plurality of pairs are determined from measurement reports sent by a same UE at different locations;
the plurality of measurement reports comprise measurement reports sent by different UEs each sending measurement reports at different locations,
steps (b) and (c) are separately performed for each of the different UEs to separately determine an estimated location of the radio network node for each of the different UEs based on pairs of estimated measurement locations corresponding to the respective different UE, and
the estimated location of the radio network node is determined as an intersected area of the locations of the radio network node estimated for a plurality of the different UEs.

11. The network node of claim 10, wherein the processing means are further configured to:
report the estimated location of the radio network node to an entity for further processing.

12. The network node of claim 10, wherein at least one of the estimated measurement locations is determined based on the signal strength information included in the respective measurement report and known locations of the one or more neighboring radio network nodes.

13. The network node of claim 10, wherein at least one of the estimated measurement locations is determined based on location information determined by the respective UE, wherein the location information is sent by the respective UE to the one or more neighboring radio network nodes.

14. The network node of claim 13, wherein the location information is mapped to the respective measurement report using an anonymized identifier.

15. The network node of claim 10, wherein, when the locations of the radio network node estimated for the plurality of the different UEs comprise intersected areas having different overlapping degrees, the estimated location of the radio network node is determined as an area comprising the k most overlapped areas of the intersected areas, wherein k is a natural number.

16. The network node of claim 10, wherein the plurality of measurement reports comprise measurement reports sent by different UEs and wherein identifying a subregion in which the radio network node is more likely located comprises compensating differences in reception sensitivities of the different UEs.

17. The network node of claim 10, wherein the plurality of measurement reports corresponds to a subset of all measurement reports sent by the one or more UEs to the one or more neighboring radio network nodes.

18. The network node of claim 10, wherein steps (b) and (c) are performed on a subset of the estimated measurement locations, wherein the subset is selected to have a uniform geographical distribution over an area covered by the estimated measurement locations.

19. The network node of claim 10, wherein the processing means comprise at least one processor and at least one memory, the at least one memory containing instructions executable by the at least one processor such that the processing means are operable to perform the operations defined in claim 10.

20. A system comprising a network node according to claim 10 and the one or more UEs.

* * * * *